Dec. 11, 1928.  
B. F. GUSTAFSON  
SEED DUSTING APPARATUS  
Filed Sept. 16, 1926  
1,694,442
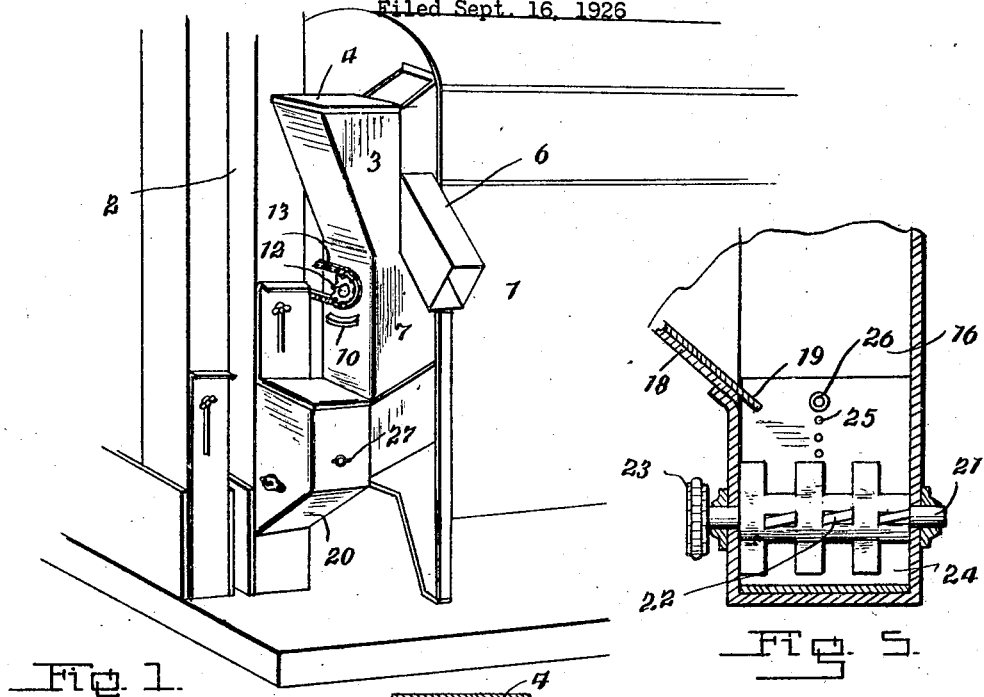
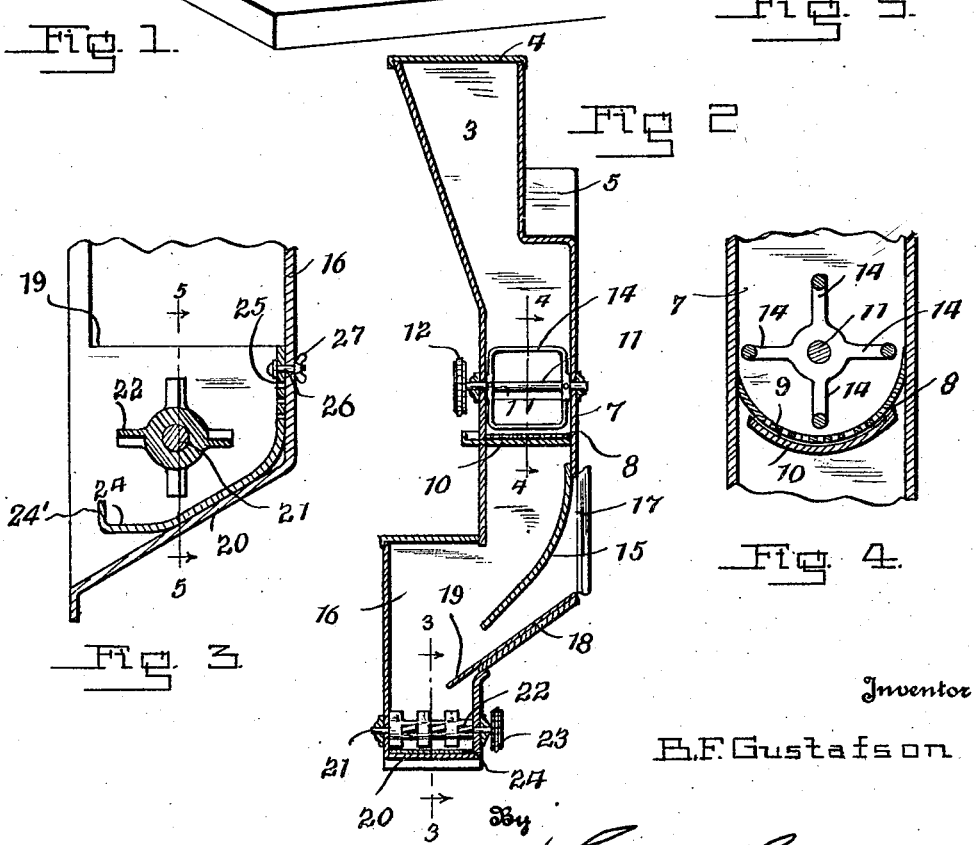
Inventor  
B. F. Gustafson  
By Lacey & Lacey, Attorneys Patented Dec. 11, 1928.

1,694,442

UNITED STATES PATENT OFFICE.

BENJAMIN F. GUSTAFSON, OF REDFIELD, SOUTH DAKOTA.

SEED-DUSTING APPARATUS.

Application filed September 16, 1926. Serial No. 135,862.

This invention relates to means for treating seed with a powdered chemical, such as copper carbonate to destroy and prevent fungous growth, such as smut, which prevents germination of the seed after it is planted, one object of the invention being to provide a simple and efficient mechanism which may be connected with a seed-cleaning machine to receive the cleaned seed therefrom and then apply the chemical thereto. The invention provides an apparatus whereby only cleaned seed is treated and the obnoxious dust which escapes from machines heretofore employed is confined within the machine and the ill effect of the same upon operators is avoided. The invention also provides a machine which may be operated under low power and by the use of which the chemical is spread evenly on a thin stream of grain instead of being mixed with a large mass so that an economy in the use of the chemical is effected and the grain is treated more evenly than has been the case with any previous machines known to me. These stated objects, and other objects which will appear incidentally in the course of the following description, are attained in such an apparatus as is illustrated in the accompanying drawing, and the invention resides in certain novel features which will be particularly pointed out in the appended claims.

In the drawing:

Figure 1 is a perspective view of my improved seed-treating apparatus showing the same arranged in connection with a seed cleaner in operative position;

Fig. 2 is a central vertical longitudinal section through the apparatus;

Fig. 3 is an enlarged detail section on the line 3—3 of Fig. 2;

Fig. 4 is an enlarged detail section on the line 4—4 of Fig. 2, and

Fig. 5 is a section on the line 5—5 of Fig. 3.

In the drawing, the reference numeral 1 indicates a portion of a seed-cleaning machine, which may be of any approved construction, and 2 designates an elevating conveyer which receives the cleaned and treated seed from my machine and delivers it into a sack or other receptacle. The apparatus of my invention includes a housing so shaped as to provide a hopper 3 at its upper end equipped with a cover 4 of such dimensions that it will fit tightly upon the top of the hopper. On one side the hopper is provided with an offset 5 presenting an inclined shoulder whereby the frame or housing may fit close to the end of the seed cleaner 1 under the spout 6 thereof through which the waste matters are discharged onto the ground. The housing of the machine also includes an intermediate vertical portion 7 in direct communication with the hopper 3 to receive the chemical therefrom and across the said intermediate portion extends a concave screen 8. This screen may be of any approved form and is illustrated as a metallic plate having openings 9 therethrough. Immediately below the screen, a cut-off slide 10 is mounted in the outer wall of the housing to play through a slot formed therein, and this slide is concave in cross section, as shown clearly in Fig. 4, whereby it may fit close against the under side of the screen 8. By withdrawing the slide to a greater or less extent, more or less of the openings 9 in the screen will be uncovered and the quantity of the powder permitted to pass through the screen will thus be regulated. Above the screen and concentric therewith, a beater or stirrer shaft 11 is mounted in the walls of the hopper and is equipped at its outer end with a sprocket 12, around which is trained a chain 13 operatively connecting the shaft with a shaft of the seed-cleaning machine so that the power will be transmitted to the stirrer from the operating parts of the seed cleaner. The stirrer shaft 11 has secured thereto a plurality of radially disposed stirring arms 14 of a bail-like formation so that they are adapted to cut through the body of powder and break up all lumps which tend to form therein and, by moving over the screen in juxtaposition thereto, will force the powder through the uncovered openings of the screen in a stream commensurate with the work to be done.

Below the screen 8 and the cut-off 10, a chute or apron 15 is secured to the rear wall of the housing, and this apron or chute extends away from said wall within the housing and outwardly, as shown clearly in Fig. 2, so that the chemical dropping through the screen will be directed into the offset lower chamber 16 of the housing. Behind the apron or chute 15, an opening 17 is provided in the wall of the housing and the housing is fitted to the seed cleaner in such position that this opening 17 will register with the discharge opening of the cleaner for the cleaned seed, the cleaned seed, consequently, passing through the opening 17 in a thin stream and being received upon the inclined bottom 18 of the intermediate portion of the housing whereby it will pass under the apron or chute 15 and travel over the said inclined bottom or chute 18 to be delivered into the mixing chamber. It will be noted that the bottom 18 is provided with an overhanging terminal portion 19 which projects beyond the lower end of the apron or chute 15 so that the stream of seed will be supported in such position that the stream of chemical will flow onto the seed and then pass to the mixer with the seed. Excess feeding of the chemical is thereby avoided. The mixing chamber 16, as shown clearly in Fig. 1, is offset or disposed laterally with respect to the intermediate portion of the housing and has an inclined bottom 20 whereby the cleaned and treated seed will be directed into the lower portion of the elevating conveyer to be taken up by the latter and carried to the receptacle provided for storing the seed. Extending across the lower end portion of the mixing chamber is a mixer shaft 21 having paddles 22 of any approved form thereon within the mixing chamber and equipped at its rear end with a sprocket 23 operatively connected with the driving sprocket of the elevating conveyer so that the mixer is driven from the elevator and, if the elevator should stop for any reason, the mixer will stop and, consequently, clogging of the elevator will be prevented. Supported by the bottom 20 and the outer side wall of the mixing chamber is an apron or chute 24 which passes under the mixer and has its free end disposed within the discharge opening of the mixing chamber so that the seed will be directed into the conveyer. This apron or chute 24 also serves to retain excessive chemical which may be subsequently collected and returned to the hopper 3, a retaining lip or flange 24' being provided at its free end edge. The opposite end portion of the apron or chute 24 is upturned so as to rest against the outer wall of the mixing chamber and is provided with a series of openings 25 through any one of which a set bolt 26 may be inserted, the said set bolt passing through the wall of the mixing chamber and being equipped with a wing nut 27 whereby it may be secured in place. Obviously, by properly setting the member 24, the size of the stream of seed and chemical passing through the mixing chamber may be regulated and the flow retarded sufficiently to permit thorough commingling of the seed and the chemical through the action of the mixer rotating above the apron 24. It will be noted that the seed and chemical flow by gravity over the respective chutes 19 and 15, the drop of the chemical from chute 15 being more nearly vertical than the drop of the seed from the chute 19 and occurring somewhat prior to the escape of seed from the latter chute, the result being that the seed may be said to travel for a short distance across the path of the chemical. The cut-off 10 is adjusted to obtain the proper proportional relation between the seed and the chemical and the natural commingling of the seed and chemical as they pass over the chute 19 will cause the chemical to adhere to the seed, the rolling of the seed (so to speak) in the powdered chemical being increased or perfected by the action of the mixer shaft and blades. Some of the chemical may drop from the seed and this chemical is caught by the apron 24 and is prevented from escaping therefrom by the retaining lip 24'.

It is thought the operation of my apparatus will be readily understood from the foregoing description, taken in connection with the accompanying drawing. The chemical is placed in the hopper 3 and, of course, flows to the screen 8. When the seed cleaner is set in motion, the stirrer and feeder will be rotated over the screen 8 so that the chemical will be fed through the screen to the lower portion of the housing and will drop onto the apron 15 down which it will slide to drop onto the cleaned seed coming from the seed cleaner and flowing over the chute or incline 18. The seed and chemical which thus meet are deposited in the mixing chamber in rear of the mixer and are acted upon by the mixer so as to be agitated and effect a thorough covering of all the seed with the chemical, the treated seed being kicked by the mixer over the end of the chute 24 into the elevating conveyer.

By my apparatus, the cleaning and treating of the seed is accomplished in one operation and an economy is thereby effected over the methods previously employed which treated the seed in a separate distinct operation independent of the cleaning operation. By the use of my attachment, only the cleaned wheat is treated and the foreign grains taken from the wheat by the cleaning machine are not touched by the chemical so that they may be used for feed or any other desired purpose. All the joints in my apparatus are made dust-proof by soldering or otherwise so that the treated grain is at all times within dust-tight enclosures from the time it is received in the housing until it is delivered to the bin or sack and it is not necessary for the operators to wear masks as is the universal custom when operating other machines. By properly setting the chute 24 and the cut-off 10, both the stirrer and the mixer can be adjusted for the weight of the grain being treated and for accurately gaging the amount of chemical permitted to reach the grain. The chemical is spread evenly on a thin stream of grain and waste of the chemical through excessive application of the same to the grain is practically eliminated. Very little power is required to operate the machine and the grain is treated as fast as it is passed through the cleaner.

Having thus described the invention, I claim:

1. An apparatus for the purpose set forth comprising a hopper, a mixing chamber vertically below the hopper and in communication therewith and provided with a lateral inlet opening through which to receive seed to be treated, a screen between the hopper and said inlet opening, a stirrer cooperating with said screen, and a deflecting chute below the screen and in front of and extending over said inlet opening to direct the chemical from the screen onto the seed flowing through said opening below the chute.

2. An apparatus for the purpose set forth comprising a vertically disposed housing defining a hopper at its upper end and a mixing chamber at its lower end and having an inlet opening in one side below the hopper to admit seed to be treated, means above said opening to control flow of chemical from the hopper, a mixing device in the lower portion of the mixing chamber, the mixing chamber having an outlet in one side in proximity to the mixing device and means in front of the inlet opening whereby chemical will be directed onto the inflowing seed in a thin stream.

3. An apparatus for the purpose set forth comprising a vertically disposed housing defining a hopper at its upper end, and a mixing chamber at its lower end and having an inlet opening for seed to be treated in one wall above the mixing chamber, a mixer in the lower end of the mixing chamber, a chute leading from the inlet opening into the mixing chamber to deliver seed over the mixer, and a chute secured in the housing above and extending over the inlet opening and terminating over the first-mentioned chute whereby to direct chemical onto the inflowing seed.

4. An apparatus for the purpose set forth comprising a vertically extending housing defining a hopper in its upper end and a mixing chamber in its lower end, a screen at an intermediate point in the height of the housing, a slidable cut-off mounted in the housing to cooperate with said screen and control flow therefrom, a stirrer rotatably mounted in the housing over the screen to cooperate therewith, a seed inlet in one wall of the housing below the screen, means below the screen for directing chemical and seed by gravity laterally into the mixing chamber, and means for commingling the chemical and seed in the mixing chamber and discharging the same laterally therefrom.

5. An apparatus for the purpose set forth comprising a vertically extending housing defining a hopper in its upper end and a mixing chamber in its lower end, the housing having an outlet opening in one wall of the mixing chamber and being provided in another wall above said chamber with an inlet opening for seed, a rotatable mixer within the mixing chamber, a vertically adjustable chute supported on the bottom and one wall of the mixing chamber and passing under the rotatable mixer to the outlet opening, means above the seed inlet opening for feeding chemical to the inflowing seed, and a deflector in front of said opening to direct the chemical toward the mixing chamber.

6. An apparatus for the purpose set forth comprising a vertically extending housing defining a hopper for chemical in its upper portion and a mixing chamber in its lower portion, and having a seed inlet opening in one wall between the hopper and the mixing chamber, and means above said opening whereby gravitating chemical will be directed onto inflowing seed substantially in the direction of flow of the seed.

7. An apparatus for the purpose set forth comprising a vertically extending housing having its upper end forming a hopper and its lower end forming a mixing chamber, the intermediate portion of the housing being offset relative to the hopper and the mixing chamber, a transversely curved screen in the offset portion of the housing, an agitator working over said screen, a cut-off under the screen, the intermediate portion of the housing having a seed inlet opening in one wall below the screen, a chemical directing chute secured to said wall above the inlet opening and extending downwardly away from said wall over the inlet opening, a chute extending inwardly and downwardly from the lower side of the inlet opening and projecting over the mixing chamber beyond the lower end of the fixed-mentioned chute, and a rotary mixer in the mixing chamber under the end of the chute, the mixing chamber having an outlet in one wall in proximity to said mixer.

In testimony whereof I affix my signature.

BENJAMIN F. GUSTAFSON. [L. S.]